Dec. 27, 1966  W. H. RAMSELL  3,293,807
DUAL PROJECTION THEATER AND CONSOLE
Filed May 13, 1963  3 Sheets-Sheet 1

INVENTOR.
WILLIAM H. RAMSELL
BY Harvey J. Lawhurst
ATTORNEY

Dec. 27, 1966 W. H. RAMSELL 3,293,807
DUAL PROJECTION THEATER AND CONSOLE
Filed May 13, 1963 3 Sheets-Sheet 2

INVENTOR.
WILLIAM H. RAMSELL
BY
ATTORNEY

Dec. 27, 1966   W. H. RAMSELL   3,293,807
DUAL PROJECTION THEATER AND CONSOLE
Filed May 13, 1963   5 Sheets-Sheet 3
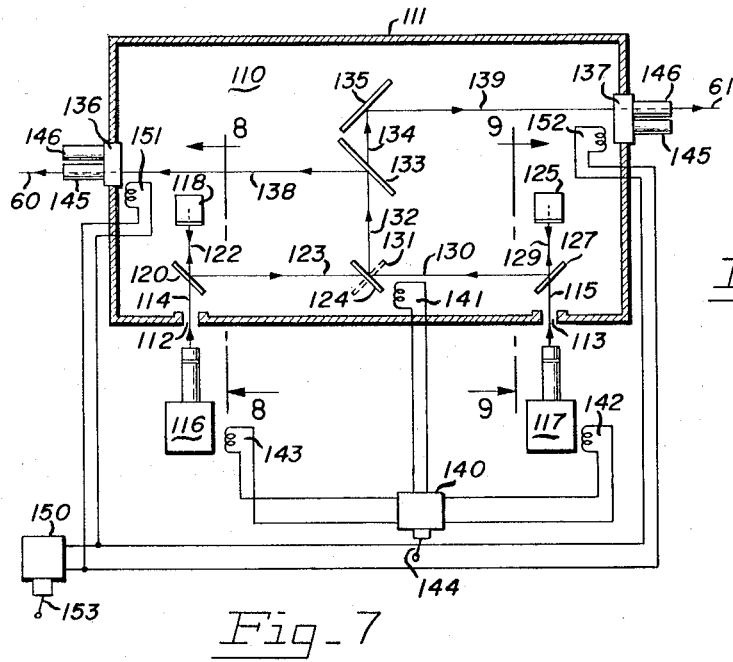
Fig_7
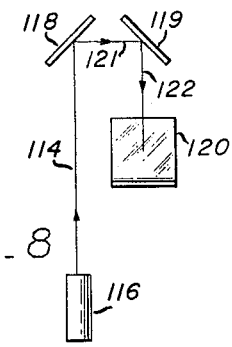
Fig_8
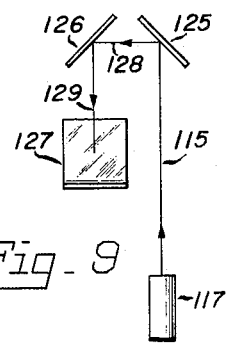
Fig_9
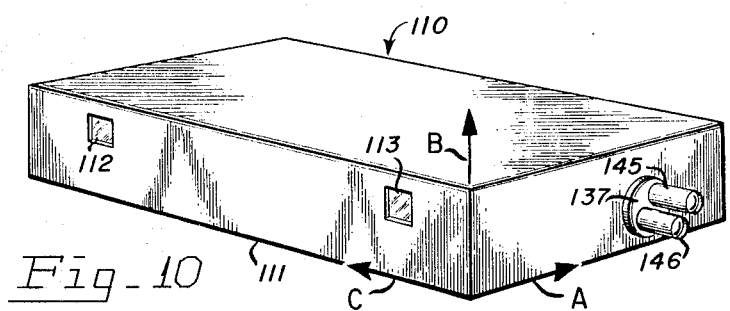
Fig_10
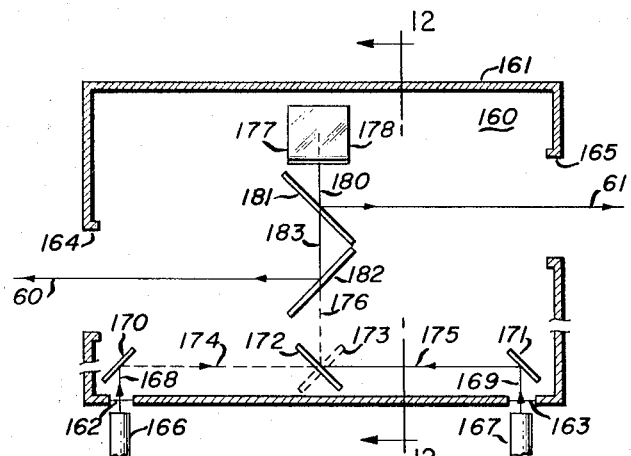
Fig_11
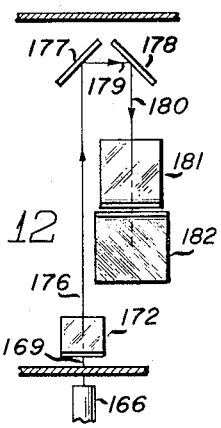
Fig_12
INVENTOR.
WILLIAM H. RAMSELL
BY Harvey S. Lonhurst
ATTORNEY

3,293,807
DUAL PROJECTION THEATER AND CONSOLE
William H. Ramsell, 1682 Hamilton Ave.,
Palo Alto, Calif. 94303
Filed May 13, 1963, Ser. No. 280,040
14 Claims. (Cl. 52—6)

This invention relates to a means and a method for exhibiting still or motion pictures by projection, and more particularly, to a theater for seating two separate audiences facing two separate projection screens and to a console for projecting pictures upon the two projection screens simultaneously.

It is a well known fact that today's motion picture theaters have many seats, particularly those at the sides as well as those nearest and furthest from the screen, which barely provide marginal seeing or hearing to a patron placed therein. Since operators of motion picture theaters desire to accommodate as many patrons as possible to obtain the largest economic returns from exhibitions, it is only natural that a maximum number of seats are placed in the auditorium and that only little attention is paid to the fact that a substantial number of the seats provide less than optimum seeing and hearing.

In "Building, Planning & Design Standards," by Harold R. Sleeper, published by John Wiley & Son, Inc., New York (1955), the author provides, on pages 98–100, a number of criteria for determining the optimum seating zone with respect to a front illuminated projection screen. Accepting the data given there as proper, the optimum seating zone is defined as a ring-shaped sector starting a distance of three times and ending a distance of five times the projection screen width so that the depth is approximately twice the screen width. The sides of the optimum seating zone for a front illuminated screen are defined by a pair of lines making a 60-degree angle with the projection screen and having their vertex at the side of the screen opposite to the side of the optimum seating zone they define. Accordingly, a theater having a screen 20 feet wide has an optimum seating zone starting 60 feet from the screen and extends to 100 feet. Such consideration makes it understandable why motion picture theaters place seats outside the optimum seating zone since a loss of 60 feet in front of the theater would, in most cases, be commercially unjustifiable.

Several attempts have been made heretofore to increase optimum zone seating in motion picture theaters without diminishing the total seating capacity. One of these attempts is described in U.S. Patent 1,348,069 issued on July 27, 1920, to Van Fleet for Moving Picture Theaters. Van Fleet shows a theater in which the audience is divided into two sections, which face each other, to view a front-illuminated projection screen located adjacent to the opposite wall of the auditorium. In other words, the auditorium is constructed so as to provide a screen at each end thereof, and the floor area is divided into two sections with chairs facing each other across the center of the auditorium. The audience seated in one section now views the projection screen at the far end of the other section. In this manner, the marginal seating area closest to one projection screen is utilized to seat an audience to view a separate screen in the opposite direction.

The arrangement proposed by Van Fleet relates to the modification of a "standard" size theater and contemplates the utilization of two, rather than one, "standard" size screens and the positioning of screens in the "standard" location, i.e., at the far end of the auditorium, without regard to the location and dimension of the optimum seating zone for the screens employed. Utilizing the criteria set for the above for the optimum seating zone of a front illuminated screen, it is immediately evident that the screen dimensions of Van Fleet are unrelated to the associated seating zone, that the side and rear seats of Van Fleet are outside the optimum seating zone, and that part of the front seats of the optimum seating zone have been removed. It has also been found that the criteria for determining the sides of the optimum seating zone changes when the projection screen is illuminated from the rear. Manufacturers of rear-illuminated projection screens define the sides of the optimum seating zone as being determined by lines drawn from the center of the projection screen making an angle of 35 degrees with the perpendicular bisector of the screen. In other words, optimum viewing is within a 70-degree cone. This increases the lengths of the first row substantially, thereby increasing the floor area of the optimum seating zone for each screen.

In addition to increasing the optimum viewing angle to a 70-degree cone, rear-illuminated projection screens have certain additional advantages which make them ideally suited for theater use. One further advantage is the elimination of the keystone effect which causes certain distortion and the distortion due to illuminating the viewing screen from above such as by a projection angle of 30 degrees. With rear-illuminated projection screens the projected beam can be perpendicular to the screen. Additionally, the ambient light level of the auditorium portion of the theater may be much higher since the screen does not reflect light so that ushers may be dispensed with entirely.

The motion picture theater described by Van Fleet also introduces a form of discomfort which may be even greater to the audience than the one it seeks to eliminate, namely, to remove seats in the immediate proximity of the screen. This discomfort is due to the fact that each of the two audiences, when looking at the screen at the other end of the auditorium, is exposed directly to the brilliant, moving and almost blinding projection beam which illuminates the front surface of the viewing screen in back of them and serves as the projection screen to the opposite audience.

Another problem frequently encountered in present day theaters, and particularly in those theaters in which patrons are permitted to smoke, is that the projection beam illuminating the projection screen from above the heads of the audience is diffracted by the rising smoke. It is a common experience that the resulting smoke pictures formed by diffraction of the projection beam are annoying and distracting and interfere with the tranquil enjoyment of the matter viewed. This problem is even further magnified by the arrangement shown by Van Fleet.

It is therefore a primary object of this invention to provide a theater for viewing of projected images in which the majority of seats are within the optimum seating zone without diminishment of the total seating capacity.

Another object of this invention is to provide a theater utilizing rear-illuminated projection screens.

It is also an object of this invention to provide an improved theater for viewing projected images in which all patrons are assured of good seats and in which the capacity per unit of auditorium floor space is greatly increased over that found in conventional theaters.

It is another object of this invention to provide a theater for the viewing of projected images in which the audience is completely shielded from the beam which projects the images upon the projection screen.

It is a further object of this invention to provide a motion picture theater having a pair of projection screens, each serving a different seating section of the auditorium.

It is a still further object of this invention to provide a dual projection console for projecting images simultaneously upon two projection screens, without interruption or detraction as a result of accommodating, alternately, first one projector and then a second projector at the end of one reel and the beginning of a second reel.

It is also a further object of this invention to provide a dual projection picture theater in which the optimum seating zone associated with a projection screen is increased in extent by utilizing rear-illuminated projection screens.

It is still a further object of this invention to provide a dual projection console for illuminating two separate screens from a single light beam passing through a single transparency.

It is still a further object of this invention to provide means by which a single film or transparency may be projected simultaneously on two different screens located at points to be advantageously viewed from different parts of a theater.

It is still another object of this invention to provide an improved building structure specifically designed for the exhibition of projected images, of either the single or moving picture type, which provides maximum enjoyment for the audience and maximum capacity for increased revenues.

It is still another object of this invention to provide a theater for the viewing of projected pictures which eliminates marginal seating without diminishing the capacity of the audience and in which the patrons are shielded from the light beam with which the image is projected onto the screen.

Briefly, in the present invention the theater is divided into two sections forming a pair of facing auditoriums. Each auditorium includes a plurality of rows of seats facing the opposite auditorium. Furthermore, each auditorium is provided with a viewing screen which is illuminated from the back and which serves as a viewing screen to the audience sitting in the other auditorium.

The projection screens are positioned in optimum distance from the portion of the auditorium they serve so that the first and last rows of seats are approximately within the optimum seating zone of that portion of the auditorium and without regard for the portion of the auditorium in which the screen is situated. Above the projection screen is a picture projection console which divides the projection beam into two branch beams traveling in opposite directions above and past the projection screens. A ceiling-like partition, forming the roof line of the theater, is interposed between the upper edge of the screen and below the beams to shield the viewing audience from the light. The beam is then bent downwards behind the screens and reversed in direction to illuminate the rear surface of the screen.

Other objects and a better understanding of the invention may be had by reference to the following description, taken in conjunction with the accompanying drawings, in which.

Figure 4:
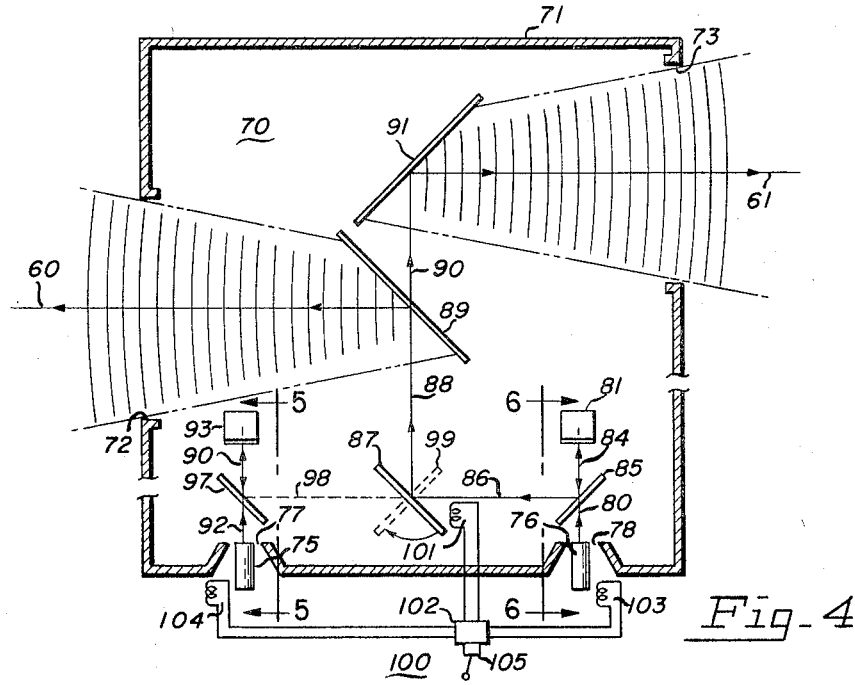
Figure 5:
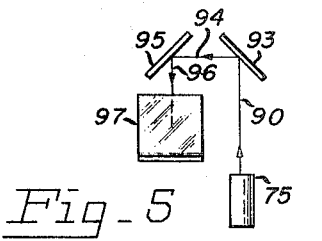
Figure 6:
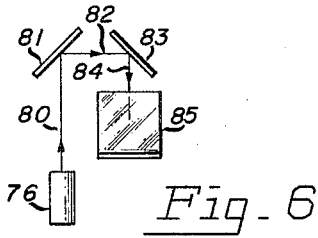

FIG. 4. is a view, in cross section, of a projection console constructed in accordance with this invention;

FIGS. 5 and 6 are views taken respectively along lines 5—5 and 6—6 of FIG. 4;

FIG. 7 is a cross-sectional view of another embodiment of the projection console of this invention;

FIGS. 8 and 9 are views taken respectively along lines 8—8 and 9—9 of FIG. 7;

FIG. 10 is a perspective view of the projection console of FIG. 7;

FIG. 11 is a top view of a further embodiment of the projection console of this invention; and FIG. 12 is a view taken along lines 12—12 of FIG. 11.

Figure 1:
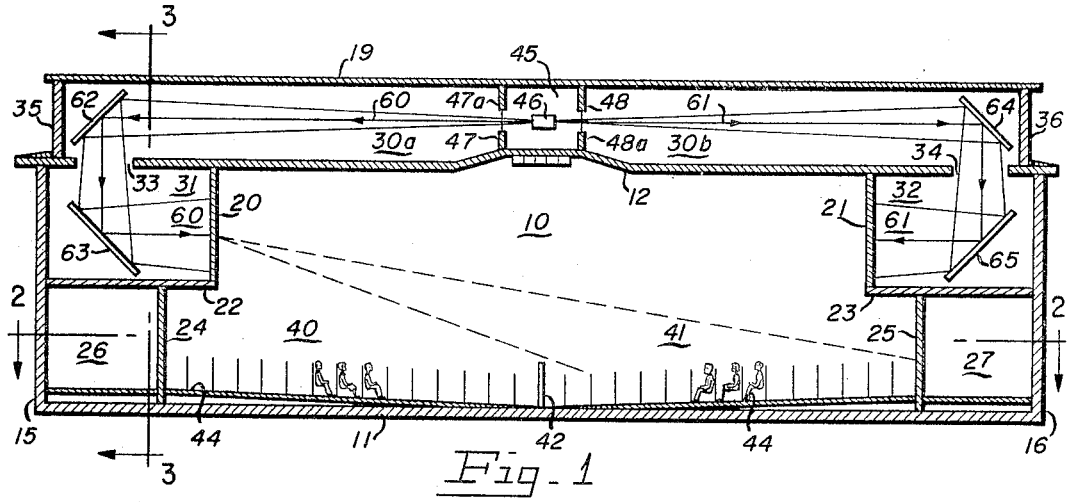
FIG. 1 is a side view, in cross section, of the theater constructed in accordance with this invention.
Figure 2:
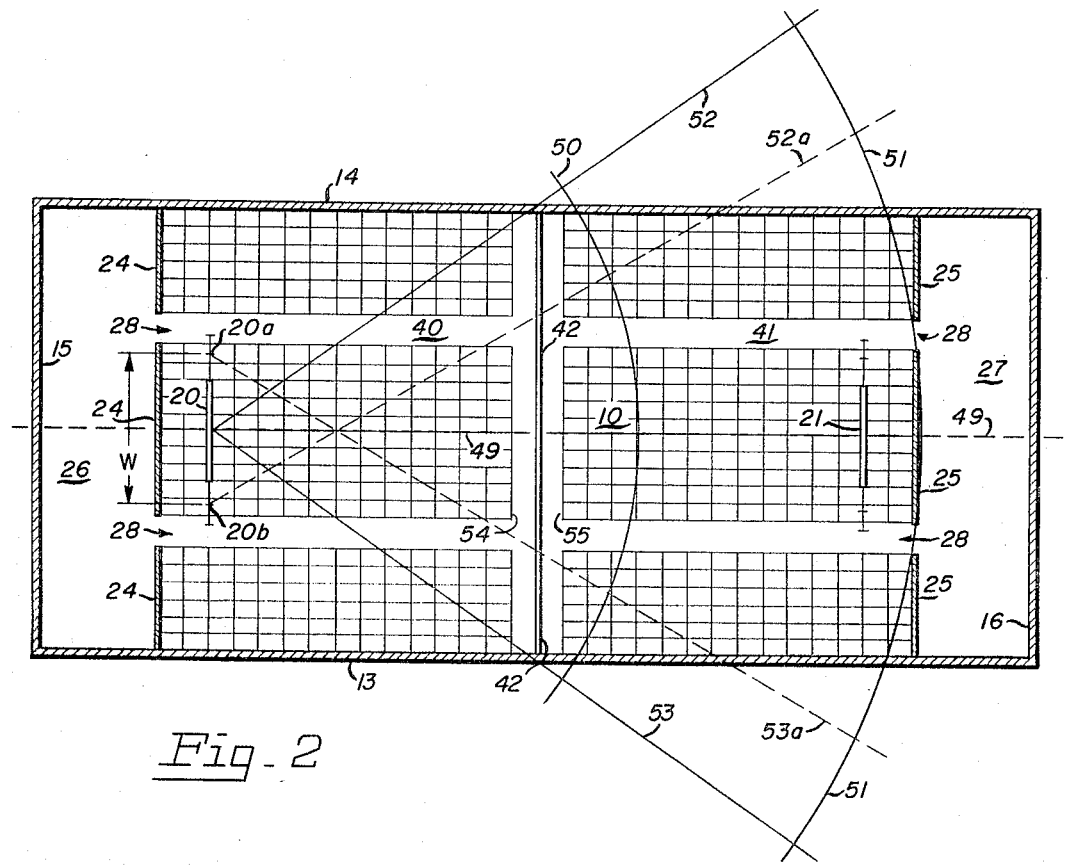
FIG. 2 is a reduced view taken along line 2—2 of FIG. 1.
Figure 3:
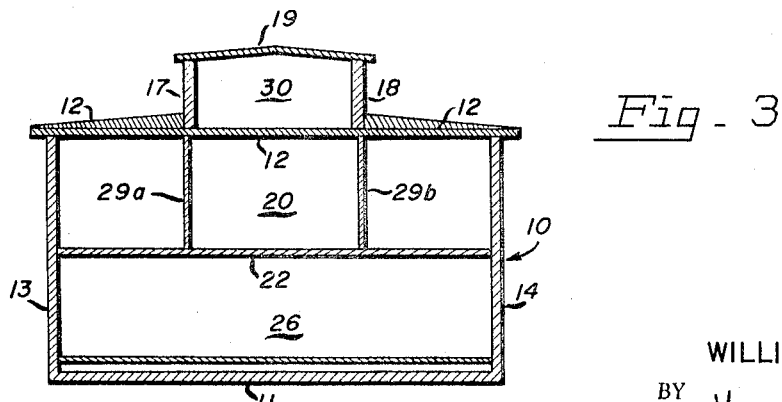
FIG. 3 is a view taken along line 3—3 of FIG. 1.

Referring now to the drawing, and particularly to FIGS. 1 to 3 thereof, there is shown a dual projection theater constructed in accordance with this invention and designated generally by reference character 10. Theater 10 comprises a floor 11, a ceiling or roof 12, a pair of side walls 13 and 14, and a pair of end walls 15 and 16. Floor 11, ceiling 12, and walls 13, 14, 15 and 16 form the perimeter walls or shell of what is generally referred to herein as the theater, and the constructional details thereof may be conventional. However, the dimensions, and particularly the ratio of the width to the length of the auditorium and the relationship between those dimensions and that of the viewing screen, are carefully selected in accordance with the teachings hereinafter made.

A pair of viewing screens 20 and 21 are supported below ceiling 12 and above a pair of partial ceilings 22 and 23, respectively. Partial ceilings 22 and 23 extend inwardly from end walls 15 and 16 to terminate in the plane of screens 20 and 21. Partial ceilings 22 and 23 may be structurally supported by a pair of short vertical partitions 24 and 25, respectively, extending in width between side walls 13 and 14 to form low end walls. Also, partial ceilings 22 and 23 may extend between side walls 13 and 14 so that a pair of entrance lobbies 26 and 27 are formed at opposite ends of theater 10 to provide ready access to the seating zone of the theater.

In other words, ceilings 22 and 23 form the lobbies' roof lines, and end walls 24 and 25 form the lobbies' side walls, the remaining sides being formed by end walls 15 and 16, respectively. Suitable doors may be located at positions such as are shown at 28 to provide ready access from lobbies 26 and 27 to the seating portion of the theater.

Projection screens 20 and 21 are respectively disposed to have their upper edge below ceiling 12 and their lower edge above partial ceilings 22 and 23. As a practical matter, the distance between the main ceiling 12 and partial ceilings 22 and 23 may be selected to coincide with the height of the screens, or the screens may be supported in frames extending between the ceilings.

Since the width of screens 20 and 21 is less than the width of theater 10, there are openings formed between the side edges of the screens (or frames in which the screens are mounted) and side wall 13 on one side and side wall 14 on the other. To form a pair of light-proof compartments 31 and 32, behind screens 20 and 21, respectively, a pair of side panels 29a and 29b are provided for each screen, as best seen in FIG. 3, which extend substantially parallel to side walls 13 and 14. Side panels 29a and 29b have a height substantially equal to the distance of separation between theater ceiling 12 and lobby ceilings 22 and 23 and a width sufficient to close off the distance between the edges of projection screens 20 and 21, and end walls 15 and 16, respectively. Of course, instead of utilizing side panels 29a and 29b to form light-proof compartments 31 and 32, screens 20 and 21 may be placed in frames which extend all the way between side walls 13 and 14.

Above theater ceiling 12 there is provided a lightweight, tunnel-type structure having a pair of side walls 17 and 18 and a top closure wall 19. This structure defines a light-proof tunnel 30 extending substantially all along theater roof 12 and includes a projection booth 45 in its center. The tunnel portions to the left and to the right of tunnel 30, on either side of projection booth 45 as viewed in FIG. 1, are designated respectively as 30a and 30b. A pair of openings 33 and 34 are provided in theater roof 12 to respectively communicate tunnel portions 30a and 30b with compartments 31 and 32. Tunnel 30 is closed off at opposite ends by closure panels 35 and 36. As will be explained hereinafter, a projection beam 60 travels along tunnel portion 30a, through opening 33 into compartment 31, and onto the rear surface of screen 20. Similarly, another projection beam 61 travels along tunnel portion 30b, through opening 34 into compartment 32, and onto the rear surface of screen 21.

There is also shown a first group of seats 40 and a second group of seats 41, placed upon theater floor 11, either directly or upon inclined platform 44. The seats are so oriented that they face one another across a low, centrally positioned, transverse partition 42. The individual seats in each group may be arranged within each half of the auditorium in any suitable manner. For example, as indicated in FIG. 2, each group of chairs is arranged to form a center section and a pair of side sections to provide convenient access through door 28. As will be explained hereinafter, the space occupied by seat groups 40 and 41 is so dimensioned that approximately 87 percent of the individual seats placed therein are within the optimum seating zone with respect to its associated rear-illuminated projection screen and the remaining seats are directly adjacent to the optimum zone. In other words, the space selected for placement of seat group 40 is dimensioned to comprise the optimum seating zone of viewing projection screen 21, and the space selected for placement of seat group 41 is similarly dimensioned to comprise the optimum seating zone for viewing projection screen 20. Conversely, the size and distance of each projection screen is selected so that the space in which a group of seats is placed becomes the optimum seating zone for that screen.

The optimum seating zone for rear-illuminated projection screens, in accordance with the criteria given above, is defined in terms of the width of the projection screen and a viewing cone and has a projected horizontal arc in the form of a ring segment. For a screen having a width W, the optimum seating zone to first approximation, extends from a radial distance of 3W to a radial distance of 5W measured from the center of the screen. Curved lines 50 and 51 (FIG. 2) represent the beginning and end of the optimum seating zone of screen 20, based upon a mean screen width measured between points 20a and 20b, respectively, located half way between the opposite ends of a regular screen and a wide or Cinemascope screen. The use of a mean screen width is necessary for this type of projection theater, since both regular or Cinemascope film may be used during the same performance.

Having determined the depths of the optimum seating zone, the width is obtained by utilizing the criterion for back-illuminated projection screens heretofore stated. Assuming that line 49 defines the perpendicular bisector of screen 20, radial lines 52 and 53 are drawn from the intersection of bisector 49 and the plane of screen 20 to each make an angle of 35 degrees. The optimum seating zone of screen 20 is therefore the pie-shaped section extending between curved lines 50 and 51 and radial lines 52 and 53. Of course, as a practical matter, seat group 41 for most economical construction is rectangular so that side walls 13 and 14 actually define seat group 41.

The intersection of radial lines 52 and 53 with circumferential line 50 usually defines the width of the theater and thereby the seating zone. Since seats outside radial lines 52 and 53 are usually quite marginal, the points of intersection are selected to fall on side walls 13 and 14. Having determined the width of seating zone 41, its depth is then selected in accordance with the actual optimum seating zone, taking into account that a few rows may be added either in front or in back. The rows which may be added to the front, of course, depend on the separation of screens 20 and 21 and on the desired width of the aisle between seat groups 40 and 41 since the greater the screen separation, the smaller is the aisle.

By way of comparison, a pair of radial lines 52a and 53a are shown which correspond to the width of the optimum zone of a front-illuminated projection screen dimensioned and located identically to screen 20. It is immediately seen that utilization of a rear-illuminated projection screen increases the width of the optimum zone by a substantial amount, because of the increased viewing angle of translucent screens. One of the reasons for the more limited viewing angle of front-illuminated projection screens is that beaded screens are utilized which are highly directional.

As a matter of comparison, the auditorium pictured in FIG. 2 is scaled to represent a theater containing 308 seats in each section, for a total of 616 seats on the main floor. Of these 616 seats, 536 or 87% fall exactly within the optimum seating zone of rear-illuminated projection screens 20 and 21. By contrast, only 43% of the seats would fall within the optimum seating zone of a conventional, single-screen (front-illuminated) theater of the same seating capacity.

The height of the projection screen with respect to the seats may also be selected for optimum viewing comfort. Generally, it has been found that the greatest viewing angle is slightly above the horizontal. As shown in FIG. 1, if the floor line is raised towards the rear of both sides of the auditorium by, say five degrees, the patrons seated in the last row need only elevate their eyes about five degrees, while patrons seated in the front row need only raise their eyes about fifteen degrees, an angle well within the optimum zone of viewing comfort and well within the 70-degree optimum cone of light emanating from a rear projection screen. Raised platform 44 not only decreases the viewing angle, but also diminishes interference caused by patrons occupying the row directly in front and form the floor upon which seat groups 40 and 41 are respectively mounted.

At approximately the center of light tunnel 30 there is provided a projection booth 45 which may form a portion of tunnel 30 and which separates the tunnel into sections 30a and 30b as has already been stated. Disposed in projection booth 45 is a projection console 46, to be explained hereinafter. Projection booth 45 might be conveniently partitioned off by spaced partitions 47 and 48 in the customary manner. Partitions 47 and 48 each include a transparent window 47a and 48a, respectively, through which projection beams 60 and 61 may be passed from projection booth 45 to tunnel sections 30a and 30b.

Projection console 46, as will be described hereinafter in more detail, provides projection beams 60 and 61 which proceed in opposite directions to pass, respectively, through openings 47a and 48a into light tunnel sections 30a and 30b. Projection beam 60, moving to the left as viewed in FIG. 1, is reflected through an angle of 90 degrees in a downward direction by a reflector 62, and thereafter is reflected a second time through an angle of 90 degrees to the right by a reflector 63. Reflectors 62 and 63 are in light communication with one another through opening 33 in ceiling 12 and are so situated that beam 60 is reflected against the rear surfaces of projection screen 20. Likewise, projection beam 61, moving to the right, is reflected through an angle of 90 degrees in a downward direction by a reflector 64, and again through an angle 90 degrees to the left by a second reflector 65. Opening 34 permits projection beam 61 to pass through ceiling 12 and reflectors 64 and 65 are disposed to project beam 61 upon the rear surface of projection screen 21. Since screens 20 and 21 are rear-illuminated projection screens, the projected image is brilliantly visible from the front.

By way of illustration of the dimensions involved, if projection console 46 is provided with a projection lens having a focal length of 5.50 inches and if the distance between console 46 and reflector 64 is 54 feet, projection beam 61 has a height of about 6 feet and a width of about 15½ feet. This dimension provides the necessary height and width of light tunnel 30. Assuming a distance between reflectors 64 and 65 of ten feet and a further distance between reflector 65 and screen 21 of 16 feet, the image projected upon the rear of screen 21 by a 35 mm. negative and a Cinemascope lens has a height of about 10 feet and a width of 19 feet. Accordingly, for a projection lens of a given focal length the total length of the theater and the distance of the screen to an end wall are the dimensions which determine the largest size of projection image obtainable. Of course, by proper choice of projection lens any desirable picture area may be obtained.

It is to be understood that the location of light tunnel 30 and projection booth 45 and roof 12 is by way of example only and that other locations may be selected. For example, tunnel 30 may be placed below floor 11 and beams 60 and 61 may be communicated with compartments 31 and 32 through suitable light wells passing through lobbies 26 and 27. Or light wells may be placed outside end walls 15 and 16. Further, tunnel 30 may also be situated on either side of the building and the beams may be suitably reflected to provide the desired erect positive image on the rear of the projection screen.

Referring now to FIGS. 4, 5, and 6, there is shown one embodiment of projection console 46, constructed in accordance with this invention which is useful in providing beams, traveling in opposite directions. This console, generally designated as 70, comprises a housing 71 having an exit window pupil 72 for beam 60 and an exit window or pupil 73 for beam 61. A pair of projectors, schematically shown as 75 and 76 and of conventional construction, are disposed side by side to direct their beams into console 70 through entrance windows or pupils 77 and 78 respectively. Projector 75 provides a beam 92, and projector 76 provides a beam 80.

Beam 80 from projector 76, traveling in a forward direction along an axis A (defined together with axis B and axis C in FIG. 10) is first reflected through an angle of 90 degrees by reflector 81 in a downward direction out of paper along axis B to provide a beam 82 (FIG. 6). Thereafter, beam 82 is reflected once more through an angle of 90 degrees by reflector 83 to provide a beam 84 which travels in a rearward direction along axis A. Beam 84 is then reflected again through 90 degrees by reflector 85 to create beam 86 which travels to the left along axis C to be intercepted by a beam selector reflector 87 which is mounted for pivotal motion through an angle of 90 degrees when a relay coil 101 is actuated. If beam selector 87 is in the position shown, it reflects beam 86 through an angle of 90 degrees in a forward direction along axis A to form a beam 88 which is intercepted by a beam splitter 89.

Beam splitter 89 may be a half-silvered mirror, and constructed to reflect one-half and to transmit one-half of beam 88. More particularly, beam splitter 89 reflects one-half of beam 88 through an angle of 90 degrees to form beam 60 traveling to the left through window 72 along axis C. The other half of the beam is transmitted through beam splitter 89 without change of direction to form beam 90 which is intercepted by a reflector 91. Reflector 91 changes the direction of beam 90 by 90 degrees to form beam 61 traveling to the right and along axis C through window 73.

In a similar manner, beam 92 from projector 75, progressing in a forward direction along axis A, is first reflected through an angle of 90 degrees in a downward direction out of the paper along axis B by reflector 93 to form beam 94 (FIG. 5). Beam 94 is reflected through a right angle to travel rearwardly along axis A by reflector 95 to form beam 96, which is further reflected through an angle of 90 degrees to the right along axis C by a reflector 97 to form a beam 98 which is intercepted by beam selector reflector 87. When beam selector 87 assumes position 99, shown in dotted outline, beam 98 is reflected forwardly along axis A as indicated by beam 88.

All reflectors and beam splitter 89 are rigidly mounted inside housing 71 and are disposed to reflect and split either beam 80 or beam 92 to eventually form beams 60 and 61. However, as already indicated, beam selector 87 is pivotally supported for rotation upon being actuated by relay coil 101 between a first position where it intercepts beam 86 and reflects the same towards beam splitter 89, and a second position indicated by dotted lines 99 where it intercepts beam 98 and reflects the same to beam splitter 89. Instead of utilizing a pivoting beam selector, a pair of pop-up reflectors may be used in which either one or the other, but not both, simultaneously intercept the plane in which beams 86 and 98 lie.

It is readily seen that if beam 60 (or 61) is focused by projector 75 (or 76) it broadens as its distance from the projector lens increases. Therefore, each reflector intercepted must be progressively larger as the optical distance to the projector lens increases. For example, if the optical path length between the projector lens of projector 76 and exit window 73 is 117 inches, for cinemascopic production, window 73 must have a height of 12 inches and a width of 36 inches. It may be noted here that window 72 may be somewhat smaller, since the beam path is somewhat shorter by a distance equal to the optical distance between splitter 89 and reflector 91. Likewise, reflector 91 and beam splitter 89 respectively require a height of less than 12 inches and a width of less than 36 inches. Beam selector 87 and reflectors 85, 83, and 81 become progressively smaller. It has been found that the physical dimensions of projection console 70 for use with a theater such as is shown in FIG. 1 have a height, width, and length of 14, 48, and 91 inches, respectively.

Console 70 is controlled by an actuating system generally designated by reference character 100, which operates beam selector 87 and projectors 75 and 76 in synchronism. More particularly, beam selector 87 is moved between the position shown as 87 and position 99 by means of a mechanism (not shown) actuated by a relay 101. Relay 101 is controlled by a control box 102 which also controls a pair of relays 103 and 104. Relay 103 may either form a part of projector 76 to operate a gate which intercepts beam 80 or may form a part of console 70 to operate a gate or mask over window 78. Similarly, relay 104 may operate a gate in projector 75 or across window 77.

Relays 103 and 104 are interconnected in such a way that either one or the other, but not both gates can be opened simultaneously. Further, relay 101 is so interconnected with relays 103 and 104 that, in the position shown, the gate controlled by relay 103 is open and the gate controlled by relay 104 is closed. When beam selector 87 is changed to assume position 99, relay 103 closes the gate of projector 76 and relay 104 opens the gate of projector 75. A two-position toggle switch 105 may be used for operating control means 102.

Referring now to FIGS. 7, 8, and 9 there is shown another embodiment of projection console 46 which is designated 110. Console 110 is alike in many respects to console 70, except that each beam is individually focused as it passes out of the exit pupils of the console. The main advantage of console 110 over console 70 is that the former is substantially smaller in physical size and provides means for individual focusing beams 60 and 61 so that there is greater tolerance in placement of the console midway between screens 20 and 21.

More particularly, projection console 110 comprises a housing 111 having a pair of entrance pupils or windows 112 and 113 through which beams 114 and 115 from projectors 116 and 117, respectfully, are directed into console 110. Each projector is provided with an optical lens having a focal length such that the beam is made practically parallel. Therefore, beams 114 and 115 do not spread out with increase of optical distance, as was the case with projection console 70 shown in FIG. 4. The reflectors, beam selector, and beam splitter within housing 111 are substantially the same as the one described in connection with console 70, except that their size does not progressively increase. Accordingly, beams 114 and 115 are parallel beams, focused at infinity so that their cross sections remain substantially the same and independent of the optical distance from projectors 116 and 117.

Console 110 (FIG. 7) includes three fixed reflectors 118, 119 and 120 (FIG. 8) for receiving beam 112 in a forward direction along axis A to reflector 118 where it is reflected in a downward path along axis B to form beam 121, then rearwardly along axis A to form beam 122, then to the right along axis C to form beam 123, which is directed against a beam selector 124. Similarly, console 111 includes three further fixed reflectors 125, 126, and 127 (FIG. 9) for receiving beam 115 in a forward direction along axis A, then downwards along axis B to form beam 128, then rearward along axis A to form beam 129, then to the left along axis C to form beam 130, which is directed against beam selector 124. Beam selector 124 is movable between a position 124 and a position as shown by dotted outline 131, just as was explained in connection with beam selector 87, FIG. 4. The beam reflected by the beam selector, which is designated as 132, is intercepted by a beam splitter 133, which reflects one-half through 90 degrees to the left as beam 138 and transmits one-half as beam 134. Beam 134 is intercepted by a reflector 135, which reflects the same to the right to form beam 139.

There are also provided a pair of turret lenses 136 and 137 over the console exit pupils which are positioned to intercept parallel beams 138 and 139, respectively, and to focus the beams upon screens 20 and 21 as beams 60 and 61 as explained heretofore. Turret lenses 136 and 137 have a focal length selected so that the intercepted beam will be focused on and provide an image of the proper size upon the rear surface of projection screens 20 and 21.

Because beams 114 and 115 are parallel, the size of projection console 110 is considerably smaller than that of projection console 70. In fact, the size of projection console 110 for use in a theater as shown in FIG. 1 may be approximately 10 inches high, 33 inches wide, and 18 inches deep.

There is also provided projection selector control means 140, which operates relays 141, 142 and 143 in substantially the same manner as explained heretofore in connection with the description of FIG. 4. In other words, relay 141 moves rotating beam selector 124, relay 142 operates a gate in the path of projection beam 115, and relay 143 operates a gate in the path of projection beam 114. If beam selector 124 is in the position shown in FIG. 7, relay 142 is holding its associated gate open. Upon reversing the position of beam selector 124 to position 131, such as by means of a two-position toggle switch 144, the gate associated with relay 142 is closed and the gate associated with relay 143 is opened.

Optical systems 136 and 137 may be conventional optical objectives or they may be, as here shown, turret lenses having a lens 145 for standard projection and a lens 146 for cinemascopic projection (sometimes referred to as wide-angle projection). One advantage realized with console 110 is that lenses 145 and 146 may be independently adjusted to provide a sharp focus on screens 20 and 21 so that console 110 may be placed at a convenient location which is not exactly at the optical midpoint between screens 20 and 21. Also, there is no need for providing large reflectors inside console 111 to handle wide-angle projection.

For the convenience of the operator, a further control means 150 is provided which controls a pair of relays 151 and 152. Relay 151 is associated with a rotating mechanism to rotate turret lens 136. Similarly, relay 152 is associated with rotating system for changing the position of turret lens 137. Accordingly, an operator may, be means of a two-position toggle switch 153, control network 150 to change from standard projection to wide-angle projection without having to physically rotate the two lenses.

FIG. 10 shows a perspective view of projection console 110 and defines the axes used hereinbefore to explain the direction of beam projection of the beams.

A further embodiment of console 46 is shown in FIGS. 11 and 12 and depicts an arrangement for generating projection beams 60 and 61 which may be used either with common focusing as described in connection with FIG. 4, or with individual focusing as described in connection with FIG. 7. The primary advantage of the console to be described over the other console is the elimination of one pair of inverting reflectors by utilizing a common set of inverting reflectors.

As shown in FIG. 11 a console 160 is provided which includes a housing 161 having a pair of entrance pupils 162 and 163 and a pair of exit pupils 164 and 165. Projectors 166 and 167, respectively, direct their beams 168 and 169 through entrance pupils 162 and 163 into housing 161. Supported in housing 161 are a pair of fixed reflectors 170 and 171 and also a beam selector 172 having a first position designed as 172 and a second position shown in dotted outline and designated 173. Reflector 170 is positioned to intercept beam 168 and reflect the same through an angle of 90 degrees from propagation along axis A to axis C to form beam 174. Similarly, reflector 171 is placed to intercept beam 169 and reflect the same through 90 degrees from propagation along axis A to axis C to form beam 175. Beam splitter 173 selects either beam 174 or 175 to reflect the same for propagation along axis A to form beam 176.

There are provided a further pair of reflectors 177 and 178 which form the common inverting means for inverting the image for proper projection upon screens 20 and 21. Reflector 177 is positioned to intercept beam 176 and direct it downwardly along axis B to form beam 179 for interception with reflector 178. Reflector 178 changes the beam direction to axis A to form beam 180 which is now properly inverted. Beam 180 is directed against a beam splitter 181 which reflects one-half of beam 180 along the axis C to form beam 61 and transmits the other half of beam 180 to form beam 183. Beam 183 is intercepted by a reflector 182 which directs the same along axis C towards the left to form beam 60.

Operation of beam selector 172 may be the same described in connection with selector 87, FIG. 4, or selector 124, FIG. 7. Also, exit pupils 164 and 165 may be provided with optical lenses for individual focusing or with turret lenses as described in connection with FIG. 7.

There has been described hereinabove a dual projection theater which provides two groups of seats, each positioned within the optimum seating zone of an associated projection screen. Such arrangement results in optimum seating for every patron and an overall increase in the capacity of the usable auditorium space. There has also been described a dual projection console which projects two beams from a single image in opposite directions and which is thereby ideally suitable for illuminating the screens in a dual projection theater. Further, there has been described an arrangement for shielding the patrons seated in the auditorium from the projection beams, thereby increasing their viewing comfort further.

What is claimed is:

1. A theater for the viewing of projected images comprising:
   an auditorium transversely divided into first and second sections;
   a first viewing screen disposed in said first section;
   a second viewing screen disposed in said second section;
   a first plurality of seats arranged in said first section and oriented for viewing the front surface of said second viewing screen;
   a second plurality of seats arranged in said second section and oriented for viewing the front surface of said first viewing screen;
   picture projection means disposed between the planes defined by said first and second viewing screens for deriving and projecting a first and a second projection beam, derived from a single projection image, in the direction of and laterally displaced from said first and said second viewing screens, respectively;
   projection beam bending means behind the screens disposed to intercept said first and said second projection beams and arranged to bend said first and second projection beams, respectively, upon the rear surface of said first and second projection screens; and
   a projection beam barrier extending between the projection bending means with the seats of said sections disposed on one side of said barrier and the projection means disposed on the other side of said barrier, whereby the projection beams are not visible from said sections until they intercept said screens.

2. A theater for the viewing of projected images comprising:
   an auditorium transversely divided into first and second sections;
   a first viewing screen disposed in said first section;
   a second viewing screen disposed in said second section;
   a first plurality of seats arranged in said first section and oriented for viewing said second viewing screen;
   a second plurality of seats arranged in said second section and oriented for viewing said first viewing screen;
   picture projection means disposed substantially midway between said first and second viewing screens for deriving and projecting a first and a second projection beam, derived from a single projection image, in the direction of and laterally displaced from said first and said second viewing screens, respectively;
   projection beam bending means behind the screens disposed to intercept said first and said second projection beams and arranged to bend said first and second projection beams, respectively, upon the rear surface of said first and second projection screens; and
   a projection beam barrier extending between the projection bending means with the seats of said sections disposed on one side of said barrier and the projection means disposed on the other side of said barrier, whereby the projection beams are not visible from said sections until they intercept said screens.

3. A theater in accordance with claim 2 in which the auditorium is transversely divided by a partition having a height to substantially block the viewing of persons seated in one of said sections of persons seated in the other of said sections.

4. A theater in accordance with claim 2 in which said first plurality of seats is disposed and arranged to fall within the optimum viewing zone of said second viewing screen.

5. A theater in accordance with claim 2, in which said first plurality of seats is arranged and disposed to substantially occupy the largest possible rectangular area which can be fitted within the optimum viewing zone of said second viewing screen.

6. A theater in accordance with claim 2 which further includes an opaque shield disposed between said first and second plurality of seats and said picture projection means, said shield extending parallel to said auditorium to block the viewing, of persons seated in one of said sections, of the projection beam traversing said section.

7. A theater for the viewing of projected images comprising:
   an auditorium including a low partition for dividing said auditorium into first and second sections;
   a first viewing screen, having a mean width equal to W, disposed in said first section;
   a second viewing screen, also having a mean width equal to W, disposed in said second section;
   a first plurality of seats, having a width substantially equal to the cord of a circular sector of radius 3W and a central angle of 70°, arranged in said first section and disposed for viewing said second viewing screen;
   a second plurality of seats, having a width substantially equal to the cord of a circular sector of radius 3W and a central angle of 70°, arranged in said second section and disposed for viewing said first viewing screen;
   picture projection means disposed substantially midway between said first and second viewing screens for deriving and projecting a first and a second projection beam from a single image in the direction of and laterally displaced from said first and said second viewing screens, respectively; and
   projection beam bending means disposed to intercept said first and said second projection beams and arranged to bend said first and second projection beams, respectively, upon the rear surface of first and second projection screens.

8. A theater in accordance with claim 7 in which said picture projecting means is located above the upper edge of said viewing screens and said first and second projection beams pass above the associated viewing screen.

9. A theater in accordance with claim 7 in which a substantially light-proof tunnel encloses said first and second beams.

10. A theater in accordance with claim 7 in which said projection beam bending means comprises a pair of reflectors inclined 90 degrees with respect to one another and 45 degrees with respect to the axis of said first and second projection beams.

11. A theater in accordance with claim 7 in which said picture projection means comprises:
    at least one projector for providing a single projection beam which is substantially parallel by focusing the same at a very large distance;
    a housing including an entrance pupil for said single projection beam;
    a beam splitting means within said housing for splitting said single projection beam into said first and second projection beams, said housing also including an exit pupil for said first and second projection beams; and
    focusing means associated with each exit pupil for focusing said first and second projection beams respectively upon the rear surface of said first and second projection screens.

12. A theater in accordance with claim 7 in which said first and said second plurality of seats each have an overall depth of about two to three times the mean width of the facing viewing screen.

13. A theater in accordance with claim 7 in which the distance between the most distant end portion of each of said plurality of seats and its facing viewing screen is about five times the mean width of the facing viewing screen.

14. A theater in accordance with claim 7 in which the distance between the closer end portion of each of said plurality of seats and its facing viewing screen is about two to three times the mean width of the facing viewing screen.

(References on following page)

References Cited by the Examiner

UNITED STATES PATENTS

| | | | |
|---|---|---|---|
| 1,348,069 | 7/1920 | Van Fleet | 352—133 |
| 1,552,451 | 9/1925 | Roach | 88—24 |
| 1,931,668 | 10/1933 | Maurer | 88—24 |
| 1,957,947 | 5/1934 | Dreyfuss | 52—6 |
| 2,031,361 | 2/1936 | Bowen | 88—24 |
| 2,041,194 | 5/1936 | Lindenberg | 88—24 |
| 2,058,179 | 10/1936 | Rommert | 52—6 |
| 2,737,082 | 3/1956 | Dowling | 88—24 |

FOREIGN PATENTS

| | | |
|---|---|---|
| 147,540 | 12/1920 | Great Britain. |
| 502,670 | 12/1954 | Italy. |

FRANK L. ABBOTT, *Primary Examiner.*

JULIA E. COINER, JACOB L. NACKENOFF, RICHARD W. COOKE, *Examiners.*

K. E. PAYNE, L. R. RADANOVIC, J. E. MURTAGH,
*Assistant Examiners.*